(12) United States Patent
Dunne et al.

(10) Patent No.: US 8,933,598 B2
(45) Date of Patent: Jan. 13, 2015

(54) HYDROELECTRIC TURBINE WITH COIL COOLING

(75) Inventors: Paul Dunne, Dublin (IE); James Ives, Dublin (IE)

(73) Assignee: OpenHydro IP Limited, Dubin (IE)

( * ) Notice: Subject to any disclaimer, the term of this patent is extended or adjusted under 35 U.S.C. 154(b) by 153 days.

(21) Appl. No.: 13/498,629

(22) PCT Filed: Sep. 29, 2010

(86) PCT No.: PCT/EP2010/064477
§ 371 (c)(1),
(2), (4) Date: Jun. 4, 2012

(87) PCT Pub. No.: WO2011/039267
PCT Pub. Date: Apr. 7, 2011

(65) Prior Publication Data
US 2012/0235412 A1    Sep. 20, 2012

(30) Foreign Application Priority Data
Sep. 29, 2009  (EP) ..................................... 09171671

(51) Int. Cl.
*H02K 9/00*  (2006.01)

(52) U.S. Cl.
USPC ............................................. 310/52; 290/42

(58) Field of Classification Search
USPC .......... 290/42, 53, 54; 310/52, 54, 58; 130/64
See application file for complete search history.

(56) References Cited

U.S. PATENT DOCUMENTS

| 228,467 A | 6/1880 | Maclay |
|---|---|---|
| 928,536 A | 7/1909 | Pino |
| 1,710,103 A | 4/1929 | Nelson |
| 2,054,142 A | 9/1936 | Sharp |
| 2,470,797 A | 5/1949 | Thomas |
| 2,501,696 A | 3/1950 | Souczek |
| 2,563,279 A | 8/1951 | Rushing |
| 2,658,453 A | 11/1953 | Walters |
| 2,782,321 A | 2/1957 | Fischer |
| 2,792,505 A | 5/1957 | Baudry |
| 2,874,547 A | 2/1959 | Fiore |
| 3,078,680 A | 2/1963 | Wapsala |
| 3,209,156 A | 9/1965 | Struble, Jr. |

(Continued)

FOREIGN PATENT DOCUMENTS

| CA | 2388513 | 8/2000 |
|---|---|---|
| CA | 2352673 | 1/2003 |

(Continued)

OTHER PUBLICATIONS

International Search Report (Mar. 24, 2011) and Written Opinion (Mar. 24, 2011) of the International Searching Authority from corresponding Patent Cooperation Treaty (PCT) Application No. PCT/EP2010/64477.

*Primary Examiner* — Hanh Nguyen
(74) *Attorney, Agent, or Firm* — Gardner, Linn, Burkhart & Flory, LLP

(57) ABSTRACT

The present invention provides provided a hydroelectric turbine having a stator and a rotor, an array of magnets being fixed to rotor and a corresponding array of coils being fixed to the stator, the turbine further including means for cooling the coils during operation of the turbine, the cooling means preferably taking the form of one or more channels passing through the stator, in close proximity to the coils, in order to allow fluid flow through the channels to cool the coils.

16 Claims, 2 Drawing Sheets

(56) References Cited

U.S. PATENT DOCUMENTS

| | | | |
|---|---|---|---|
| 3,292,023 A | 12/1966 | Korber | |
| 3,342,444 A | 9/1967 | Nelson | |
| 3,355,998 A | 12/1967 | Roemisch | |
| 3,384,787 A | 5/1968 | Schwartz | |
| 3,422,275 A | 1/1969 | Braikevitch et al. | |
| 3,477,236 A | 11/1969 | Burrus | |
| 3,487,805 A | 1/1970 | Satterthwaite et al. | |
| 3,708,251 A | 1/1973 | Pierro | |
| 3,986,787 A | 10/1976 | Mouton, Jr. et al. | |
| 3,987,638 A | 10/1976 | Burkhardt et al. | |
| 4,095,918 A | 6/1978 | Mouton et al. | |
| 4,163,904 A | 8/1979 | Skendrovic | |
| 4,219,303 A | 8/1980 | Mouton, Jr. et al. | |
| 4,274,009 A | 6/1981 | Parker, Sr. | |
| 4,367,413 A | 1/1983 | Nair | |
| 4,421,990 A | 12/1983 | Heuss et al. | |
| 4,427,897 A | 1/1984 | Migliori | |
| 4,496,845 A | 1/1985 | Ensign et al. | |
| 4,523,878 A | 6/1985 | Richart et al. | |
| 4,541,367 A | 9/1985 | Lindberg | |
| 4,613,762 A | 9/1986 | Soderholm | |
| 4,720,640 A | 1/1988 | Anderson | |
| 4,740,711 A | 4/1988 | Sato et al. | |
| 4,744,697 A | 5/1988 | Coppens | |
| 4,744,698 A | 5/1988 | Dallimer et al. | |
| 4,810,135 A | 3/1989 | Davenport et al. | |
| 4,867,605 A | 9/1989 | Myers et al. | |
| 4,868,408 A | 9/1989 | Hesh | |
| 4,868,970 A | 9/1989 | Schultz et al. | |
| 4,990,810 A | 2/1991 | Newhouse | |
| 5,495,221 A | 2/1996 | Post | |
| 5,517,383 A | 5/1996 | Webb | |
| 5,592,816 A | 1/1997 | Williams | |
| 5,606,791 A | 3/1997 | Fougere et al. | |
| 5,609,441 A | 3/1997 | Khachaturian | |
| 5,656,880 A | 8/1997 | Clark | |
| 5,662,434 A | 9/1997 | Khachaturian | |
| 5,715,590 A | 2/1998 | Fougere et al. | |
| 5,800,093 A | 9/1998 | Khachaturian | |
| 5,998,905 A | 12/1999 | Fougere et al. | |
| 6,039,506 A | 3/2000 | Khachaturian | |
| 6,109,863 A | 8/2000 | Milliken | |
| 6,166,472 A | 12/2000 | Pinkerton | |
| 6,168,373 B1 | 1/2001 | Vauthier | |
| 6,232,681 B1 | 5/2001 | Johnston et al. | |
| 6,242,840 B1 | 6/2001 | Denk et al. | |
| 6,300,689 B1 | 10/2001 | Smalser | |
| 6,367,399 B1 | 4/2002 | Khachaturian | |
| 6,406,251 B1 | 6/2002 | Vauthier | |
| 6,409,466 B1 | 6/2002 | Lamont | |
| 6,445,099 B1 | 9/2002 | Roseman | |
| 6,476,709 B1 | 11/2002 | Wuidart et al. | |
| 6,612,781 B1 | 9/2003 | Jackson | |
| 6,648,589 B2 | 11/2003 | Williams | |
| RE38,336 E | 12/2003 | Williams | |
| 6,729,840 B2 * | 5/2004 | Williams | 415/3.1 |
| 6,770,987 B1 | 8/2004 | Sogard et al. | |
| 6,777,851 B2 | 8/2004 | Maslov | |
| 6,806,586 B2 | 10/2004 | Wobben | |
| 6,840,713 B1 | 1/2005 | Schia et al. | |
| 6,843,191 B1 | 1/2005 | Makotinsky | |
| 6,857,821 B2 | 2/2005 | Steenhuis et al. | |
| 6,894,416 B1 | 5/2005 | Leijon et al. | |
| 6,957,947 B2 | 10/2005 | Williams | |
| 6,995,479 B2 | 2/2006 | Tharp | |
| 6,998,730 B2 | 2/2006 | Tharp | |
| 7,190,087 B2 | 3/2007 | Williams | |
| D543,495 S | 5/2007 | Williams | |
| 7,275,891 B2 | 10/2007 | Owen et al. | |
| 7,352,078 B2 | 4/2008 | Gehring | |
| 7,378,750 B2 * | 5/2008 | Williams | 290/43 |
| 7,425,772 B2 | 9/2008 | Novo Vidal | |
| 7,471,009 B2 | 12/2008 | Davis et al. | |
| 7,527,006 B2 | 5/2009 | Khachaturian | |
| 7,611,307 B2 | 11/2009 | Owen et al. | |
| 7,845,296 B1 | 12/2010 | Khachaturian | |
| 7,874,788 B2 | 1/2011 | Stothers et al. | |
| 8,022,581 B2 * | 9/2011 | Stiesdal | 310/45 |
| 8,350,400 B2 | 1/2013 | Rosefsky | |
| 8,368,242 B2 * | 2/2013 | Holstein et al. | 290/54 |
| 2002/0034437 A1 | 3/2002 | Williams | |
| 2003/0044272 A1 | 3/2003 | Addie et al. | |
| 2003/0137149 A1 | 7/2003 | Northrup et al. | |
| 2003/0155829 A1 | 8/2003 | McMullen et al. | |
| 2003/0168864 A1 | 9/2003 | Heronemus et al. | |
| 2003/0193198 A1 | 10/2003 | Wobben | |
| 2003/0218338 A1 | 11/2003 | O'Sullivan et al. | |
| 2004/0021386 A1 | 2/2004 | Swett | |
| 2004/0021437 A1 | 2/2004 | Maslov et al. | |
| 2004/0201299 A1 | 10/2004 | Naritomi et al. | |
| 2004/0227500 A1 | 11/2004 | O'Meara | |
| 2004/0232792 A1 | 11/2004 | Erfourth | |
| 2004/0262926 A1 | 12/2004 | Hansen | |
| 2005/0005592 A1 | 1/2005 | Fielder | |
| 2005/0031442 A1 | 2/2005 | Williams | |
| 2005/0073151 A1 | 4/2005 | Diamontopoulos | |
| 2006/0261597 A1 | 11/2006 | Gehring | |
| 2007/0018459 A1 | 1/2007 | Williams | |
| 2007/0063448 A1 | 3/2007 | Kowalczyk | |
| 2007/0164626 A1 | 7/2007 | Taniguchi et al. | |
| 2007/0231072 A1 | 10/2007 | Jennings et al. | |
| 2007/0241566 A1 | 10/2007 | Kuehnle | |
| 2007/0262668 A1 | 11/2007 | Brisson et al. | |
| 2007/0291426 A1 | 12/2007 | Kasunich et al. | |
| 2008/0012538 A1 | 1/2008 | Stewart et al. | |
| 2009/0278357 A1 | 11/2009 | Williams | |
| 2010/0025998 A1 | 2/2010 | Williams | |
| 2010/0026002 A1 | 2/2010 | Spooner | |
| 2010/0068037 A1 | 3/2010 | Ives | |
| 2010/0133838 A1 | 6/2010 | Borgen | |
| 2010/0172698 A1 | 7/2010 | Ives et al. | |
| 2010/0201129 A1 | 8/2010 | Holstein et al. | |
| 2010/0232885 A1 | 9/2010 | Ives et al. | |
| 2010/0295388 A1 | 11/2010 | Ives et al. | |
| 2011/0018274 A1 | 1/2011 | Ives et al. | |
| 2011/0088253 A1 | 4/2011 | Ives et al. | |
| 2011/0110770 A1 | 5/2011 | Spooner et al. | |
| 2011/0291419 A1 | 12/2011 | Dunne et al. | |
| 2011/0293399 A1 | 12/2011 | Dunne et al. | |
| 2011/0298216 A1 | 12/2011 | Ives et al. | |
| 2011/0304148 A1 | 12/2011 | Dunne et al. | |
| 2012/0027522 A1 | 2/2012 | Ives et al. | |
| 2012/0175877 A1 | 7/2012 | Ives et al. | |
| 2012/0187680 A1 | 7/2012 | Spooner et al. | |

FOREIGN PATENT DOCUMENTS

| | | |
|---|---|---|
| CH | 260699 | 4/1947 |
| CH | 146935 | 8/1983 |
| DE | 3116740 | 11/1982 |
| DE | 3638129 | 5/1988 |
| DE | 3718954 | 12/1988 |
| DE | 19948198 | 4/2001 |
| DE | 10101405 | 7/2002 |
| DE | 20308901 | 9/2003 |
| DE | 10244038 | 4/2004 |
| DE | 102007016380 A1 | 10/2008 |
| EP | 1318299 A1 | 6/2003 |
| EP | 1564455 | 1/2005 |
| EP | 1691377 | 2/2006 |
| EP | 1876350 | 1/2008 |
| EP | 1878912 | 1/2008 |
| EP | 1878913 | 1/2008 |
| EP | 1879280 A1 | 1/2008 |
| EP | 1878911 | 9/2008 |
| EP | 1992741 | 11/2008 |
| EP | 1885047 | 12/2008 |
| EP | 1980670 | 7/2009 |
| EP | 2088311 | 8/2009 |
| EP | 2110910 | 10/2009 |
| EP | 2112370 | 10/2009 |
| EP | 1980746 | 6/2010 |
| EP | 2199199 | 6/2010 |
| EP | 2199598 | 6/2010 |

(56) References Cited

FOREIGN PATENT DOCUMENTS

| | | |
|---|---|---|
| EP | 2199599 | 6/2010 |
| EP | 2199601 | 6/2010 |
| EP | 2199602 | 6/2010 |
| EP | 2199603 | 6/2010 |
| EP | 2200170 | 6/2010 |
| EP | 2071709 | 9/2010 |
| EP | 2209175 | 9/2010 |
| EP | 2241749 | 10/2010 |
| EP | 2302204 | 3/2011 |
| EP | 2302755 | 3/2011 |
| EP | 2302766 | 3/2011 |
| FR | 2823177 A1 | 10/2002 |
| FR | 2859495 | 3/2005 |
| GB | 204505 | 10/1923 |
| GB | 924347 | 4/1963 |
| GB | 980575 | 1/1965 |
| GB | 1131352 | 10/1968 |
| GB | 1413835 | 11/1975 |
| GB | 2316461 | 2/1998 |
| GB | 132344843 | 6/2000 |
| GB | 2408294 | 5/2005 |
| GB | 2431628 | 5/2007 |
| GB | 2434413 | 7/2007 |
| GB | 2447514 | 9/2008 |
| JP | 59203881 | 11/1984 |
| JP | 63055370 | 3/1988 |
| JP | 01043908 | 2/1989 |
| JP | 2000341818 | 12/2000 |
| JP | 2005069025 | 3/2005 |
| JP | 2005248822 | 9/2005 |
| JP | 2006094645 | 4/2006 |
| JP | 2007255614 | 10/2007 |
| JP | 2007291882 | 11/2007 |
| NO | WO 2008/127114 | * 10/2008 |
| WO | WO9844372 | 11/1998 |
| WO | WO9852819 | 11/1998 |
| WO | WO9966623 | 12/1999 |
| WO | WO0077393 | 12/2000 |
| WO | WO 0134973 | 5/2001 |
| WO | WO0134977 | 5/2001 |
| WO | WO0299950 | 12/2002 |
| WO | WO03014561 | 3/2003 |
| WO | WO03025385 | 6/2003 |
| WO | WO2004107549 | 2/2004 |
| WO | WO2004015264 | 4/2004 |
| WO | WO03046375 | 12/2004 |
| WO | WO2004027257 | 12/2004 |
| WO | WO2004113717 | 5/2005 |
| WO | WO2005045243 | 7/2005 |
| WO | WO2005061887 | 8/2005 |
| WO | WO2005078233 | 9/2005 |
| WO | WO2005080789 | 12/2005 |
| WO | WO2005116443 | 3/2006 |
| WO | WO2006029496 | 4/2007 |
| WO | WO2007043894 | 5/2007 |
| WO | WO2007055585 | 7/2007 |
| WO | WO2007083105 | 8/2007 |
| WO | 2007125349 A2 | 11/2007 |
| WO | WO2007086814 | 11/2007 |
| WO | WO2008004877 | 1/2008 |
| WO | WO2008006614 | 1/2008 |
| WO | WO2008050149 | 5/2008 |
| WO | WO2008081187 | 7/2008 |
| WO | WO2010118766 | 10/2010 |
| WO | WO2011039249 | 4/2011 |
| WO | WO2011039255 | 4/2011 |
| WO | WO2011039267 | 7/2011 |

* cited by examiner

1

HYDROELECTRIC TURBINE WITH COIL COOLING

FIELD OF THE INVENTION

This invention relates to a hydroelectric turbine, in particular for deployment in tidal sites in order to harness the energy of the tide to generate electricity, which turbine is modified to provide improved performance and/or reliability.

BACKGROUND OF THE INVENTION

The area of renewable energy has in recent years, due to the threat of global warming and other related issues, seen significant advances, with large resources and investment being channelled into developing new or improved forms of renewal energy. One particular area which holds significant potential is in the harnessing of tidal energy, in particular through the use of seabed deployed hydroelectric turbines. These turbines can run essentially twenty four hours a day delivering consistent energy and without any environmental impact or other drawbacks.

However, harnessing tidal energy does provide its own challenges, in particular with respect to the installation and maintenance of tidal power generators, for example hydroelectric turbines, which by the very nature of the operation of same must be located in relatively fast flowing tidal currents, and more than likely located on the seabed. In addition, in order to be economically viable these turbines must be built on a large scale. As a result the turbines and associated bases/supports are large and cumbersome components, and require significant heavy lifting and transport equipment in order to achieve deployment and retrieval for maintenance purposes. The use of such heavy lifting equipment is normally a hazardous undertaking, and is rendered even more dangerous when this equipment is operated at sea under difficult and unsteady conditions. As a result the retrieval process may take some time to complete. Furthermore, as the turbines are located on the seabed it is not generally possible or at least economically feasible to implement continuous visual monitoring of the turbines to check for damage to the turbine. It is therefore highly desirable that these hydroelectric turbines are relatively simple machines, and therefore reliable, and that the working components of same have a significant operating life.

One of the components most likely to suffer damage is the coils used in the electromagnetic circuit, which can, for a number of reasons, overheat and malfunction, leading to possible damage to both the electromagnetic circuit and potentially other areas of the turbine. This will at the least result in a reduction of the power output of the turbine, and may result in the total shutdown or inoperability of the turbine, therefore requiring retrieval and repair of the turbine.

It is thus an object of the present invention to overcome the above mentioned problems.

SUMMARY OF THE INVENTION

According to the present invention there is provided a hydroelectric turbine comprising a stator and a rotor; an array of magnets fixed to one of the stator or rotor; a corresponding array of coils fixed to the other of the stator or rotor; and means for cooling the coils during operation of the turbine.

Preferably, the cooling means are adapted to utilise the surrounding water in order to effect cooling of the coils.

Preferably, the cooling means are adapted to promote water flow past or in close proximity to the coils in order effect the transfer of heat from the coils.

Preferably, the stator and the rotor are positioned relative to one another to define a gap therebetween and on opposed sides of which gap the coils and magnets are positioned, and wherein the cooling means comprises one or more guides adapted to promote water flow through the gap.

Preferably, the one ore more guides are fixed to the rotor.

Preferably, the one or more guides are formed integrally with one or more bearings of the turbine.

Preferably, the bearings comprise a circular array of bearing blocks for bearing axial loads, a leading edge or face of one or more of the bearing blocks being profiled to promote water flow through the gap during relative rotation between the rotor and stator.

Preferably, the coils are mounted to the stator and the cooling means comprise one or more channels formed in the stator and passing in close proximity to the coils, the one or more channels being open to the surround water at each end in order to allow water flow therethrough.

Preferably, the one or more channels are oriented to extend, with the hydroelectric turbine positioned in a tidal flow, substantially in line with the direction of tidal flow.

Preferably, both ends of the one or more channels are position on the same side or surface of the stator.

Preferably, a gap is provided between adjacent magnets of the magnet array.

DETAILED DESCRIPTION OF THE DRAWINGS

Figure 1:
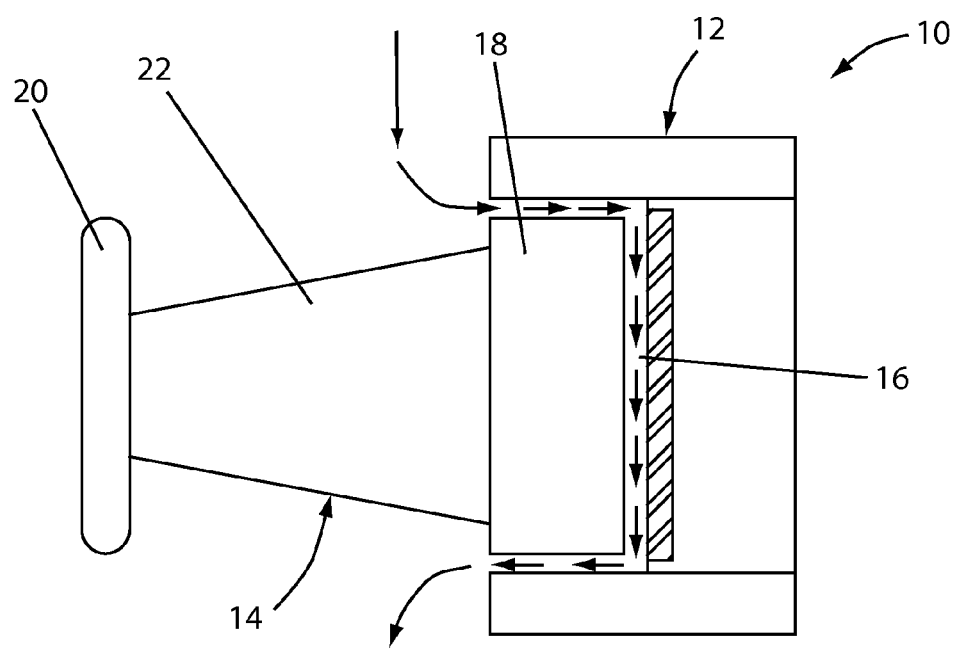
FIG. 1 illustrates a schematic representation of a section of a hydroelectric turbine according to the first embodiment of the present invention.
Figure 2:
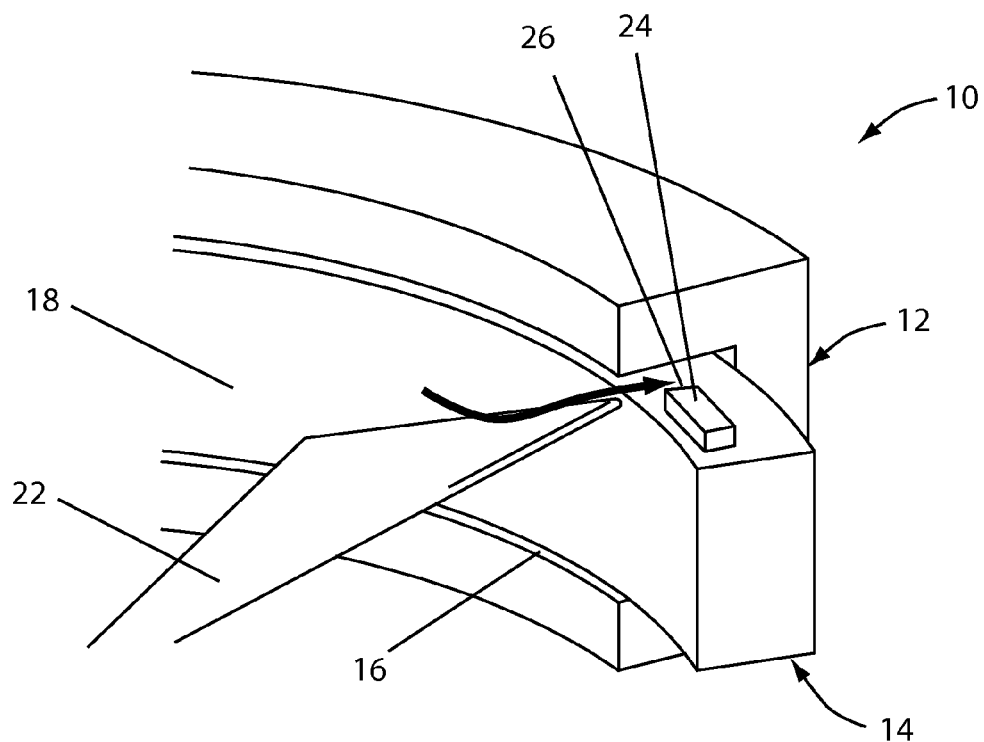
FIG. 2 illustrates a perspective view of the turbine illustrated in FIG. 1.

Referring now to FIGS. 1 and 2 of the accompanying drawings there is illustrated a first embodiment of a hydroelectric turbine, generally indicated as 10, which is adapted to provide cooling to electromagnetic coils (not shown) forming part of an electromagnetic circuit of the turbine 10.

The main components of the turbine 10 are a stator 12 within which is mounted for rotation a rotor 14. The turbine 10 will normally be configured such that an array of coils (not shown) are provided on one or other of the stator 12 and rotor 14, the other of the stator 12 and the rotor 14 being provided with a corresponding array of magnets (not shown), as is well know in the art. The coils and magnets are arranged on opposed sides of a gap 16 provided between the stator 12 and the rotor 14. The rotor 14 comprises an outer rim 18 and an inner rim 20 between which are mounted an array of blades 22. The outer rim 18 is effectively enclosed within the stator 12 and is spaced therefore by the gap 16. During operation of the turbine 10 relative movement between the stator 12 and rotor 14 drives the magnets and coils past one another, inducing an electric current in the coils, which is then extracted from the turbine 10 in any suitable manner. The flow of current through the coils of the turbine 10 results in the generation of heat in the coils, the greater the level of heat the lower the efficiency of the coils, and the greater the risk of damaging the coils or surrounding components.

The turbine 10 of the present invention is therefore adapted to induce a flow of water past or in close proximity to the above mentioned coils, in order to effect cooling of the coils and therefore ensure the consistent and efficient operation of same. An array of bearing blocks 24 are provided on the outer rim 18 which together define the main axial bearing between the stator 12 and rotor 14 in order to prevent contact therebetween during operation. At least some, and preferably all, of the bearing blocks 24 form cooling means of the turbine 10, and are therefore adapted, during rotation of the rotor 14 relative to the stator 12, to force water through the gap 16 in order to effect cooling of the coils. The bearing blocks 24 are provided with a sloped or profiled leading edge 26 which acts to drive the surrounding water up and over the bearing block 24 and through the gap 16. Additional vanes (not shown) or surface formations on the outer rim 18 or any other portion of the turbine 10 may be provided to improve or augment this functionality of the bearing blocks 24. In addition, adjacent magnets of the magnet array are slightly spaced from one another, and this space between adjacent magnets helps to promote the flow of water through the gap 16.

Figure 3:
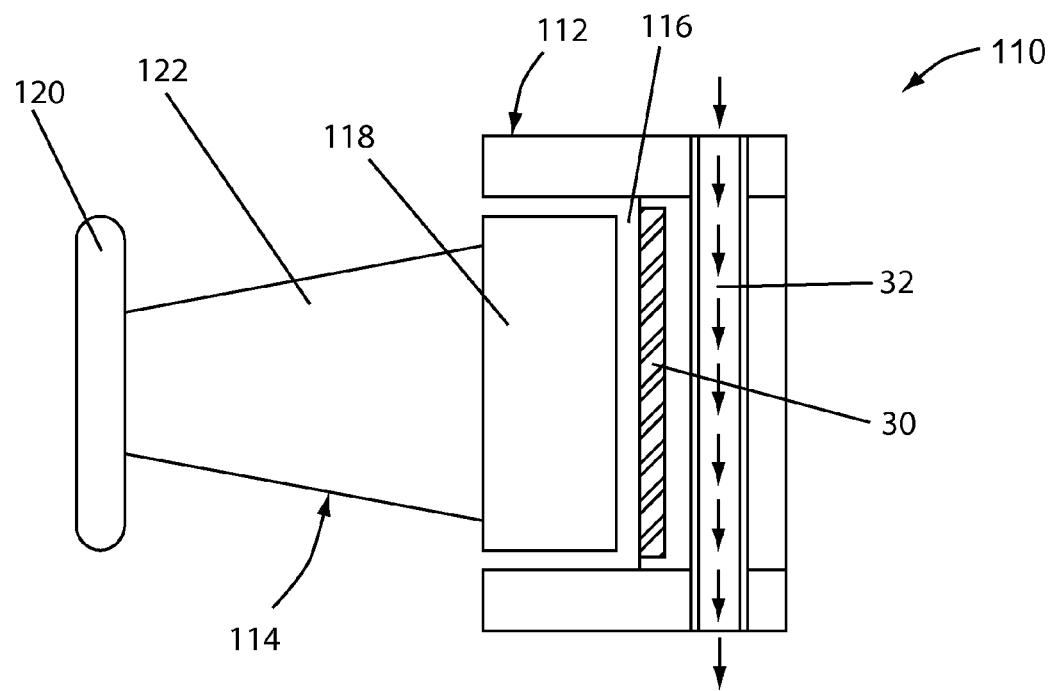
FIG. 3 illustrates a schematic representation of an alternative embodiment of a turbine according to the present invention.

Turning now to FIG. 3 there is illustrated an alternative embodiment of a hydroelectric turbine according to the present invention, generally indicated as 110. In this alternative embodiment like components have been accorded like reference numerals, and unless otherwise stated perform a like function. The turbine 110 again comprises a stator 112 and a rotor 114 mounted for rotation relative to the stator 112. The stator 112 and rotor 114 are separated by a gap 116 which is open to the surrounding water. The rotor 114 comprises an outer rim 118 and an inner rim 120, mounted between which are a circular array of blades 122. An array of coils 30 are mounted on the stator 112 and face the outer rim 118 across the gap 116. A corresponding array of magnets (now shown) are therefore mounted on the outer rim 118.

The turbine 110 further comprises cooling means in the form of a channel 32 formed in the stator 112, the channel 32 extending from one side of the stator 112 to the other side, in order to allow the flow of water therethrough. The channel 32 is positioned to be in close proximity to the rear face of the coils, in order to allow the water passing through the channel 32 to draw heat away from the coils 30. This embodiment therefore provides passive cooling of the coils 30, as the water is not driven through the channels 32 and simply flows there through under the influence of the tide. It will however be appreciated that means could be provided to actively drive or pump water through the channel 32. Such pumping means could also be powered, either mechanically or electrically, from power generated by the turbine 110.

Figure 4:
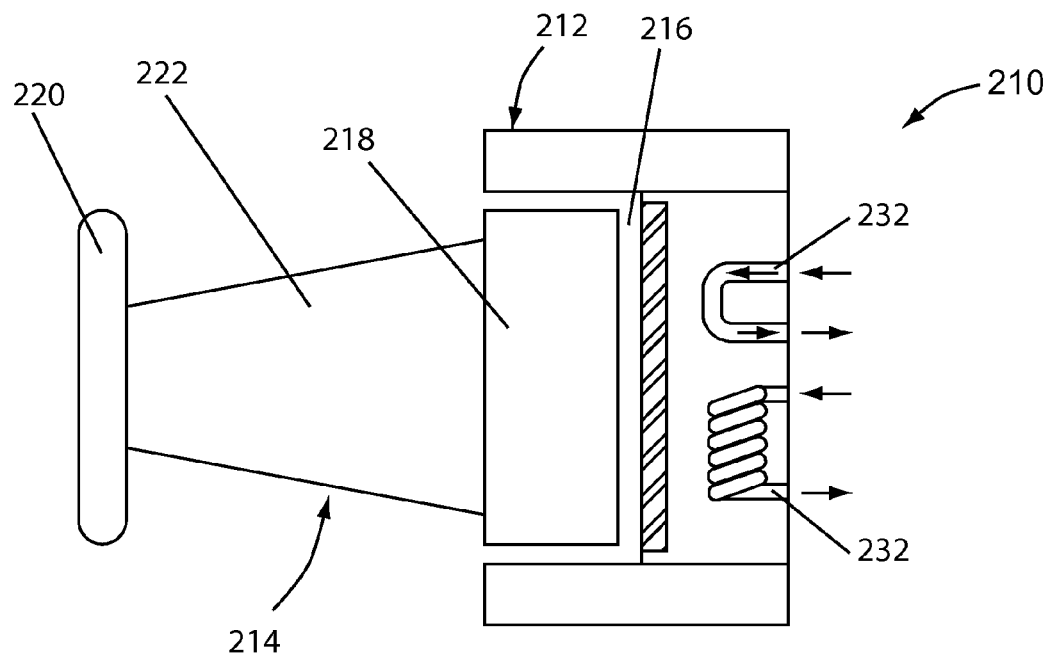
FIG. 4 illustrates a further alternative embodiment of a hydroelectric turbine according to the present invention.

Turning now to FIG. 4 there is illustrated a further alternative embodiment of a hydroelectric turbine, generally indicated as 210. Again in this embodiment like components have been accorded like reference numerals, and unless otherwise stated perform a like function. The turbine 210 comprises a stator 212 and a rotor 214, separated from one another by a gap 216. The rotor 214 comprises an outer rim 218 and an inner rim 220 mounted between which is a circular array of blades 222.

Formed in the stator 212 are a pair of channels 232 which are substantially U shaped, both ends of each channel 232 opening onto the same face of the stator 212. The channels 232 extend to a position in close proximity to the back of the coils (not shown) to maximise the transfer of heat from the coils during operation of the turbine 210. The channels 232 may be partly or fully helical in shape, in order to increase the effective length of the channels 232, and thus improve the heat transfer capabilities thereof.

It will therefore be appreciated that the turbine 10, 110, 210 of the present invention provides a simple yet effective means of drawing heat from the coils during operation. The cooling means do not generally require any additional moving parts, and thus the simplicity, and therefore reliability, of the turbine 10, 110, 210 is maintained.

The invention claimed is:

1. A hydroelectric turbine comprising a stator and a rotor; an array of magnets fixed to one of the stator or rotor; a corresponding array of coils fixed to the other of the stator or rotor; and means for cooling the coils during operation of the turbine, the stator and the rotor being positioned relative to one another to define a gap therebetween and on opposed sides of which gap the coils and magnets are positioned, and wherein the cooling means comprises one or more guides formed integrally with one or more bearings of the turbine, and adapted to promote water flow through the gap, the bearings comprising a circular array of bearing blocks for bearing axial loads, a leading edge or face of one or more of the bearing blocks being profiled to promote water flow through the gap during relative rotation between the rotor and stator.

2. A hydroelectric turbine according to claim 1 in which the cooling means are adapted to utilise the surrounding water in order to effect cooling of the coils.

3. A hydroelectric turbine according to claim 2 in which the cooling means are adapted to promote water flow in close proximity to the coils in order effect the transfer of heat from the coils.

4. A hydroelectric turbine according to claim 2 in which the cooling means are adapted to promote water flow past the coils in order effect the transfer of heat from the coils.

5. A hydroelectric turbine according to claim 2 in which the stator and the rotor are positioned relative to one another to define a gap therebetween and on opposed sides of which gap the coils and magnets are positioned, and wherein the cooling means comprises one or more guides adapted to promote water flow through the gap.

6. A hydroelectric turbine according to claim 2 in which the coils are mounted to the stator and the cooling means comprise one or more channels formed in the stator and passing in close proximity to the coils, the one or more channels having ends that are open to the surrounding water in order to allow water flow therethrough.

7. A hydroelectric turbine according to claim 6 in which the one or more channels are oriented to extend, with the hydroelectric turbine positioned in a tidal flow, substantially in line with the direction of tidal flow.

8. A hydroelectric turbine according to claim 7 in which both ends of the one or more channels are positioned on the same side of the stator.

9. A hydroelectric turbine according to claim 8 in which a gap is provided between adjacent magnets of the magnet array.

10. A hydroelectric turbine according to claim 1 in which the cooling means are adapted to promote water flow in close proximity to the coils in order effect the transfer of heat from the coils.

11. A hydroelectric turbine according to claim 10 in which the stator and the rotor are positioned relative to one another to define a gap therebetween and on opposed sides of which gap the coils and magnets are positioned, and wherein the cooling means comprises one or more guides adapted to promote water flow through the gap.

12. A hydroelectric turbine according to claim 1 in which the coils are mounted to the stator and the cooling means comprise one or more channels formed in the stator and passing in close proximity to the coils, the one or more channels having ends that are open to the surrounding water in order to allow water flow therethrough.

13. A hydroelectric turbine according to claim 12 in which the one or more channels are oriented to extend, with the hydroelectric turbine positioned in a tidal flow, substantially in line with the direction of tidal flow.

14. A hydroelectric turbine according to claim 12 in which both ends of the one or more channels are positioned on the same side of the stator.

15. A hydroelectric turbine according to claim 1 in which a gap is provided between adjacent magnets of the magnet array.

16. A hydroelectric turbine according to claim 1 in which the cooling means are adapted to promote water flow past the coils in order effect the transfer of heat from the coils.

* * * * *